United States Patent
Clute

(10) Patent No.: US 7,237,799 B2
(45) Date of Patent: Jul. 3, 2007

(54) SEAT BELT SYSTEM

(75) Inventor: Gunter K. Clute, Bloomfield Hills, MI (US)

(73) Assignee: Autoliv ASP, Inc, Ogden, UT (US)

( * ) Notice: Subject to any disclaimer, the term of this patent is extended or adjusted under 35 U.S.C. 154(b) by 444 days.

(21) Appl. No.: 10/858,026

(22) Filed: Jun. 1, 2004

(65) Prior Publication Data

US 2005/0263990 A1   Dec. 1, 2005

(51) Int. Cl.
B60R 21/18 (2006.01)
B60R 22/00 (2006.01)

(52) U.S. Cl. .............. 280/733; 280/808; 280/735

(58) Field of Classification Search ............ 280/733, 280/808, 735
See application file for complete search history.

(56) References Cited

U.S. PATENT DOCUMENTS

| | | | |
|---|---|---|---|
| 6,010,151 A | 1/2000 | Honda | |
| 6,109,647 A * | 8/2000 | Akaba et al. | 280/733 |
| 6,336,657 B1 * | 1/2002 | Akaba et al. | 280/733 |
| 6,406,059 B1 | 6/2002 | Taubenberger et al. | |
| 6,623,037 B2 * | 9/2003 | Ritters et al. | 280/801.1 |
| 6,641,165 B2 * | 11/2003 | Ohhashi | 280/733 |
| 2002/0147533 A1 * | 10/2002 | Foo et al. | 701/45 |
| 2004/0036345 A1 * | 2/2004 | Herberg et al. | 297/480 |
| 2004/0079575 A1 * | 4/2004 | Herberg et al. | 180/268 |
| 2005/0082815 A1 * | 4/2005 | Frank et al. | 280/801.1 |

FOREIGN PATENT DOCUMENTS

| | | |
|---|---|---|
| DE | 199 15 275 | 10/2000 |
| EP | 1 128 933 | 6/2002 |

* cited by examiner

*Primary Examiner*—Paul N. Dickson
*Assistant Examiner*—Timothy Wilhelm
(74) *Attorney, Agent, or Firm*—Sally J Brown; Brinks Hofer Gilson & Lione

(57) ABSTRACT

A seat belt system for motor vehicle applications incorporating a dual retractor restraint system with a portion of the seat belt webbing having a locally thick segment such as an inflatable seat belt portion. The dual retractors include electrically controlled actuating clutching mechanisms which operate to maintain the inflatable belt portion in a desired position relative to the upper torso of the seat occupant without requiring the inflatable belt portion to pass through the system D-ring or latch tongue or a high mounted retractor. When the occupant is donning the belt, the shoulder retractor is locked and the webbing is extracted from the lap retractor. Once the tongue is latched into the latch plate, the lap retractor is locked and movement of the occupant is permitted by allowing extraction of webbing from the shoulder retractor.

14 Claims, 3 Drawing Sheets

SEAT BELT SYSTEM

BACKGROUND AND SUMMARY OF THE INVENTION

This invention relates to automotive safety restraint systems and, in particular, to an active three-point seat belt system with seat belt webbing having a thick webbing section such as an inflatable seat belt section.

Numerous designs of passive and active automotive occupant restraint systems are known for enhancing occupant protection in the event of a vehicle crash. Passive systems such as inflatable restraints or air bags and automatically deployed seat belt systems are known. Active seat belt systems have been use for many decades and are manually deployed by the occupant. The conventional seat belt system uses three points of connection with the vehicle structure and incorporates a lap belt section for engaging the occupant's lower torso and a shoulder belt section for engaging the occupant's upper torso. The seat belt restrains movement of the occupant in the event of a vehicle impact or rollover event. In order to enhance the comfort and convenience provided by the seat belt system, retractors are normally used which permit the belt webbing to be extracted and retracted onto the retractor, allowing movement of the occupant while maintaining the belt in close contact with the occupant. An inertia sensitive actuator locks the retractors when an impact or rollover event is detected, preventing extraction of webbing.

A more recent development in the area of seat belt systems is that of the so-called inflatable seat belt. An inflatable seat belt system incorporates a section of the seat belt which is inflated by a gas, typically by a pyrotechnic inflator, to increase its size and volume. Thus, when an inflatable seat belt is deployed, the normally narrow seat belt webbing expands significantly to reduce the contact pressure between the seat belt webbing and the occupant during a crash sequence. Inflatable seat belts also act as a belt pretensioner by reducing belt slack. Inflatable seat belts may utilize crash sensing systems also used to control other inflatable restraint systems to initiate inflation upon the detection of a vehicle impact or rollover event having predetermined dynamic characteristics.

Certain design constraints exist with regard to presently available inflatable belt systems. Since the inflatable belt section of the seat belt webbing is significantly thicker and bulkier than the remainder of the webbing, it is difficult to have the inflatable belt section pass through the three point belt "D" ring or seat belt tongue or roll into a retractor. Moreover, passing such a thicker segment of the belt would likely degrade occupant comfort. The webbing must ordinarily undergo a sharp bend and pass through narrow openings in the D-ring and tongue. These limitations set a practical limit on the thickness of the inflatable belt section of the belt webbing and require flexibility of the inflatable belt section. A similar problem would exist with a belt system which has a segment which is thicker or more bulky, designed to be oriented across the upper torso of the occupant, but which is not inflatable.

Seat belt webbing must be provided in a long length to enable a range of occupant sizes and seat positions to be accommodated. This is especially true where the seat belt anchorages are fixed to the body of the vehicle rather than the seat. In order that the thick belt webbing section, such as an inflatable belt section, is properly positioned at the upper torso area of the occupant, the inflatable belt section must ordinarily be long, and be capable of passing through seat belt hardware components, such as the tongue and D-ring and, in some cases, a retractor.

One approach to addressing shortcomings mentioned above is to use a three point restraint system having a fixed upper shoulder belt anchorage. Variations in the length of the webbing for different sized occupants or occupant movement would be accommodated through the use of a single retractor fixed to the lap belt portion of the webbing. Differences in the length of webbing for the shoulder belt portion would be taken up by allowing the webbing to freely flow through the buckle tongue. In this case, the thick seat belt portion would be maintained at the upper torso area of the occupant since it would also be fixed to the belt, at or near the upper seat belt anchorage. Although this approach would prevent the thick belt section from having to flow through the seat belt tongue, it would not provide the desired degree of comfort and convenience available through the use of dual retractor seat belt systems and would not ideally locate the thick belt section for all occupants. Comfort and ease of use are important factors in encouraging motor vehicle occupants to take advantage of the safety benefits provided by an active seat belt system.

In accordance with the present invention, a seat belt system is provided in which the position of the thick belt section, such as an inflatable belt section is controlled to be properly positioned on the upper torso area of the occupant, without the requirement that it pass through the tongue, D-ring, or other hardware components (such as a high mounted shoulder retractor). In a preferred embodiment, the belt system is implemented with a dual retractor system. Through a particular control system and sequence in which the two retractors are locked or allowed to freely retract or extend webbing, depending on whether the belt is being deployed or latched, causing the thick belt portion of the system to be maintained at a desired position on the occupant.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
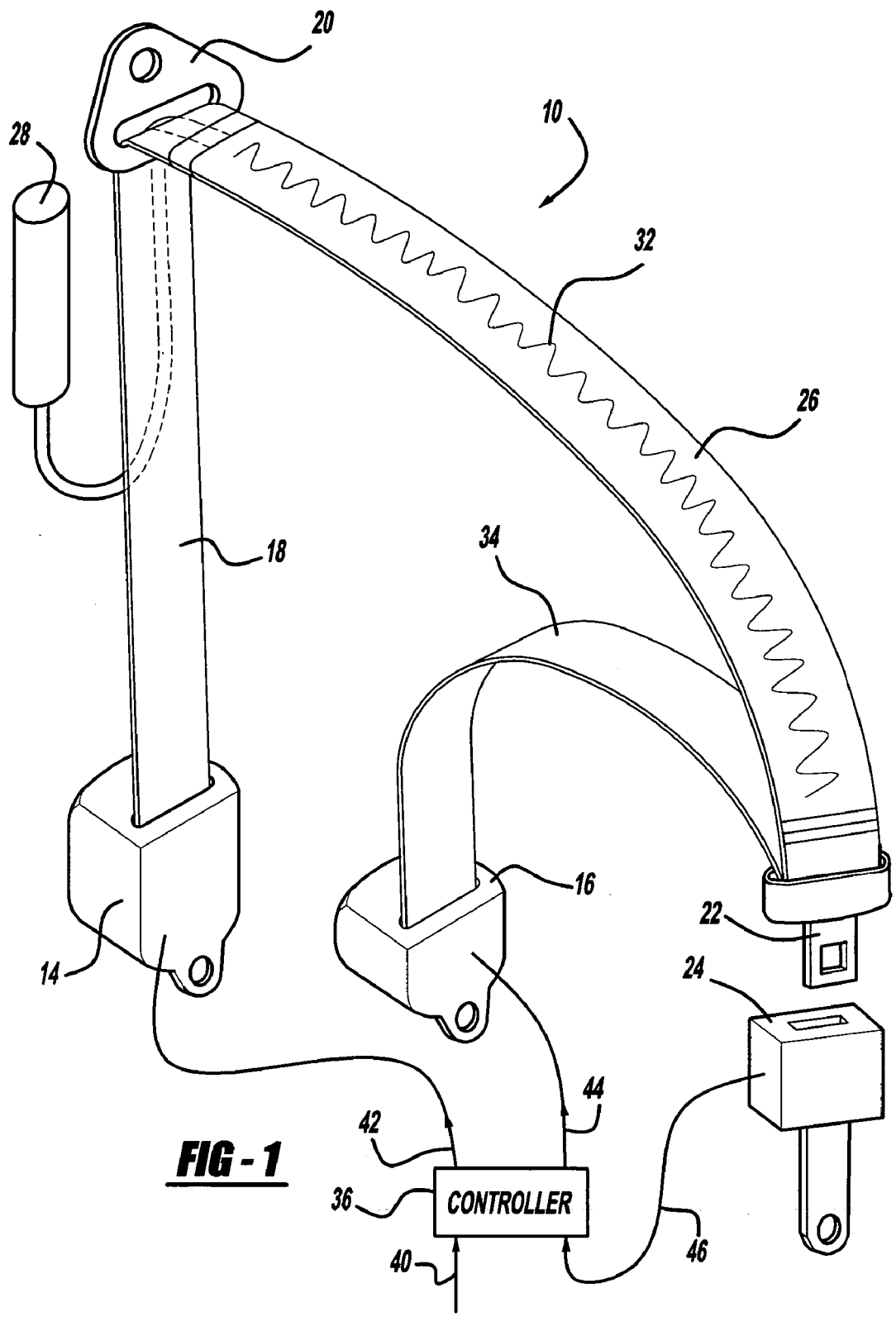
FIG. 1 is a diagrammatic view of a seat belt system in accordance with the present invention.

With reference to the Figures, seat belt system 10 is shown installed for protecting an occupant seated within vehicle seat 12. Seat belt system 10 principally comprises shoulder retractor 14, lap retractor 16, and webbing 18. Webbing 18 passes through a "D" ring 20 mounted to the vehicle, typically at the so-called "B" pillar of the vehicle. Seat belt system 10 is deployed (or "worn" or "donned") when the occupant grasps tongue 22 and inserts it into buckle 24 securing them together by "latching" the seat belt. In a preferred embodiment of the system 10, tongue 22 is permitted to freely slide along webbing 18. The thick belt section, is in the case of the illustrated embodiment, an inflatable belt section 26, is fastened to webbing 18 in a conventional manner. Shoulder retractor 14 is attached to an upper end of webbing 18 which defines the shoulder belt section 32 of the webbing which is intended to be positioned to engage the upper torso region of the occupant when the system is deployed. Shoulder belt section 32 is the section of webbing 18 between tongue 22 and D-ring 20. Lap retractor 16 is affixed to the lower end of webbing 18 which defines a lap belt section 34 of webbing 18 adapted for engaging the lower torso region of the occupant. Lap belt section 34 is the section of webbing between tongue 22 and lap retractor 16. Inflator 28 is provided for generating an expanding gas to inflate inflatable belt section 26 in the event that a vehicle crash or rollover is detected.

In some vehicle installations, shoulder and lap retractors 14 and 16 are mounted to the vehicle floor pan with D-ring 20 mounted to the B-pillar. Buckle 24 may also be mounted to the floor pan near the center tunnel. Some vehicles available today feature so-called integrated structural seats. These seats have sufficient internal structural integrity to permit the seat belt retractors and buckle to be mounted to the moveable part of the seat. Such systems are found to provide increased occupant comfort and convenience. Seat belt system 10 in accordance with this invention may be mounted in various manners, including those previously mentioned.

Other modifications of the present invention include a three-point seat belt system in which D-ring 20 is eliminated and instead shoulder retractor 14 is mounted directly to the B-pillar or vehicle seat at the position generally where D-ring 20 is shown in the drawings. Such a shoulder retractor 14 may be of the conventional reel type, or long-spool design.

Shoulder and lap retractors 14 and 16 operate in the manner of so-called emergency locking retractors in which an internal torsion spring provides a retraction force on the webbing 18 at all times. Retractors 14 and 16 include internal controllable clutches including an internal saw tooth profile ratchet wheel (not shown) within the internal reels of the retractors which engage with locking elements to prevent extraction of the webbing 18 during an impact condition. Such events may be detected through the use of internal pendulum or ball-type inertia sensitive actuators or electronic sensing devices.

In a preferred embodiment, both shoulder and lap retractors 14 and 16 include internal controllable clutch mechanisms in which their retraction and extension may be controlled electrically by controller 36, via control signals 42 and 44 (i.e. switchable between "locked" and "unlocked" modes). Occupant presence control signal 40 is provided to controller 36. Control signal 40 may be produced by occupant sensing systems such as those based on the pressure applied by the occupant positioned in the vehicle seat 12. Retractors 14 and 16 may also have internal pretensioning devices which cause slack in seat belt system 10 to be taken up in the event of a sensed impact. A belt pretensionser may also be incorporated with the anchorage of buckle 24 to cause the buckle to be retracted in the event of a sensed impact, once again with the goal of taking up slack in the seat belt system 10. Excessive slack in a seat belt allows an undesirable high degree of excursion or motion of the occupant before the belt begins to exert restraining forces on the occupant during a collision or rollover.

Figure 2:
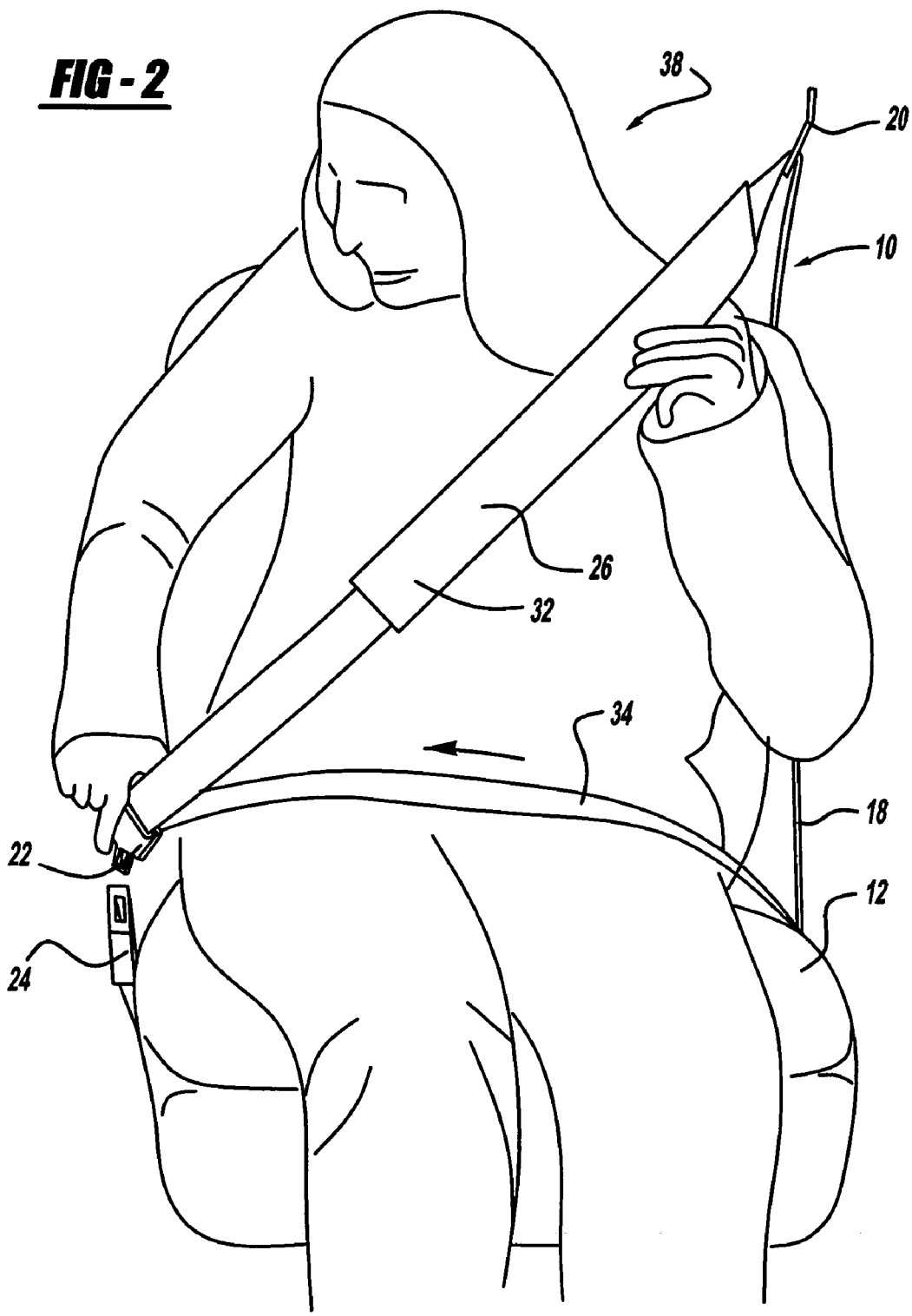
FIG. 2 is a view similar to FIG. 1 but showing the seat belt system as it is being deployed by a vehicle occupant.
Figure 3:
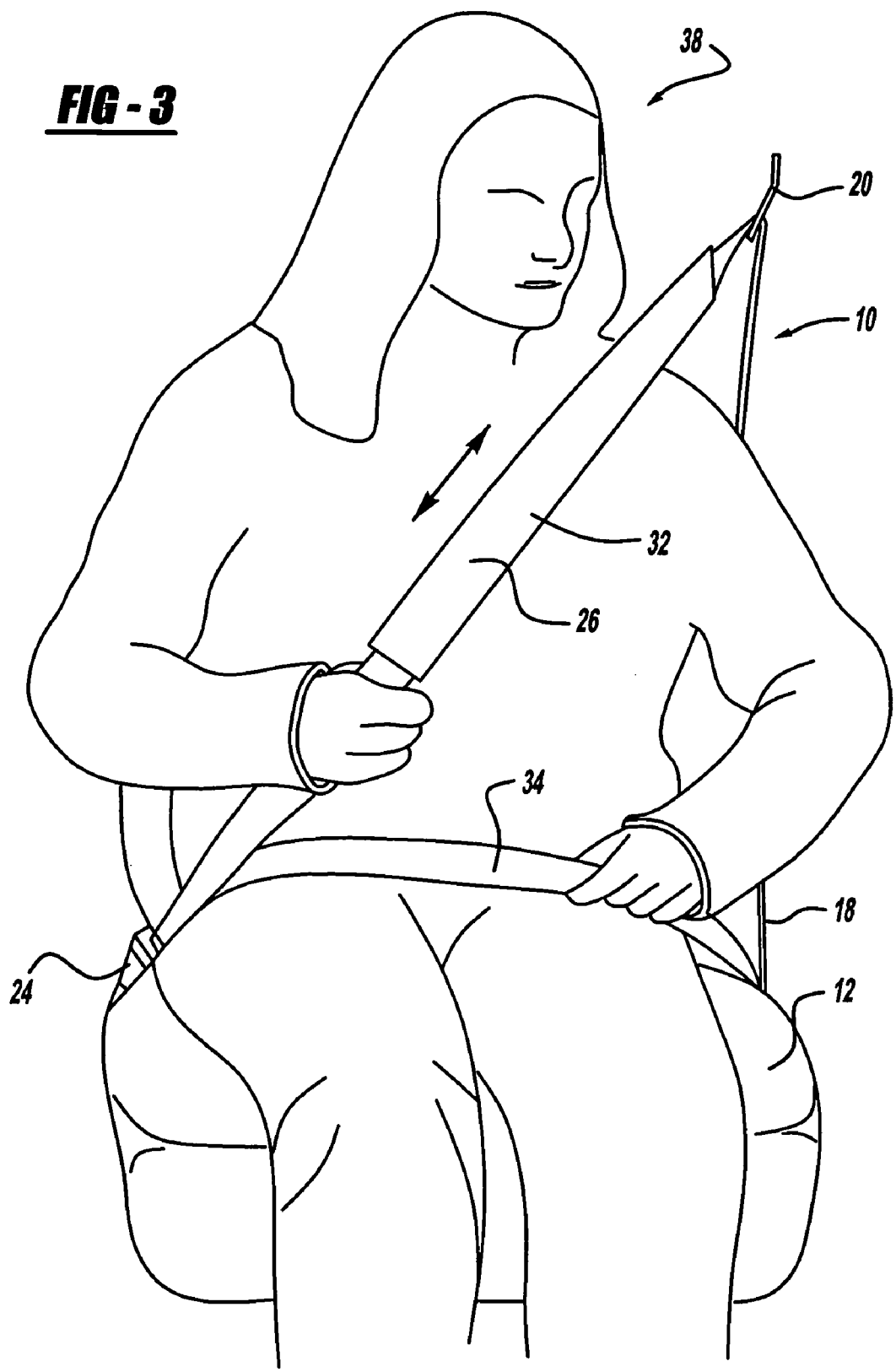
FIG. 3 is a view similar to FIG. 1 but showing the seat belt system after the occupant is seated and the seat belt tongue and buckle are latched together.

A particular control approach is utilized in accordance with this invention for the shoulder and lap retractors 14 and 16, causing the inflatable belt section 26 to be maintained in a desired position relative to the vehicle occupant, while preserving comfort and convenience of the system. Such an operation sequence proceeds as follows. When an occupant 38 is present in seat 12, and buckle 24 is not yet latched with tongue 22, the occupant grasps tongue 22 and pulls on the belt to extend it across their body to engage buckle 24. During this phase of operation shown by FIG. 2, controller 36 receiving a signal 40 indicating an occupant's presence in seat 12, and that buckle signal 46 indicated that the buckle is not latched, causes extraction of webbing from shoulder retractor 14 to be disabled (i.e. the retractor is locked) by controller signal 42 while unlocking lap retractor 16 and thus all of the extension occurs by extracting the webbing from lap belt retractor 16 as designated by the arrow. In this manner, inflatable belt section 26 is maintained in its position with its upper end adjacent D-ring 20. Once buckle 24 is latched with tongue 22 as shown by FIG. 3 as, indicated by buckle signal 46, the controller 36 locks lap belt retractor 16, preventing it from allowing further webbing extraction while unlocking shoulder retractor 14. Movement of the occupant 38 is therefore enabled by allowing extension of webbing 18 from shoulder retractor 14. In this manner, occupant 38 is allowed to move within seat 12, turn in position, actuate vehicle controls, etc. Such motion does not cause the inflatable belt portion 26 (or another locally thick webbing section) from having to pass through either D-ring 20 or tongue 22 (or shoulder retractor 14 if it were mounted in the position of D-ring 20).

The cross-sectional area of inflatable belt section 26 (or a locally thick non-inflatable section) may be selected such that it will not pass through either D-ring 20 or tongue 22 (or a high-mounted conventional or long spool shoulder retractor). This further ensures that it will be located in the proper position at the upper torso of the occupant. Since system 10 allows the inflatable belt section 26 to be accurately placed, it may have a length selected for proper coverage, without excess length needed if its position were not controlled.

While the above description constitutes the preferred embodiment of the present invention, it will be appreciated that the invention is susceptible to modification, variation and change without departing from the proper scope and fair meaning of the accompanying claims.

The invention claimed is:

1. A seat belt system for a motor vehicle for restraining an occupant in a seat comprising:
   seat belt webbing,
   a shoulder retractor having a locked mode for preventing extraction of the webbing and an unlocked mode for permitting extraction of the webbing and engaging an end of the webbing adjacent a shoulder belt section of the webbing for engaging the upper torso of the occupant,
   a lap retractor having a locked mode for preventing extraction of the webbing and an unlocked mode for permitting extraction of the webbing and engaging an end of the webbing adjacent a lap belt section of the webbing for engaging the lower torso of the occupant,
   a tongue engaging the seat belt webbing and slidable along the seat belt webbing,
   a buckle engageable with the tongue to secure the seat belt webbing across the occupant,
   a thick belt section affixed to the shoulder belt section of the webbing, and
   a controller to position the thick belt section at the upper torso of the occupant when the occupant is fastening the tongue to the buckle by selectively engaging the locked mode of the shoulder retractor and the unlocked mode of the lap retractor while the tongue is disengaged from the buckle, and engaging the unlocked mode of the shoulder retractor upon fastening of the tongue to the buckle.

2. A seat belt system in accordance with claim 1 wherein the thick belt section is an inflatable belt section.

3. A seat belt system in accordance with claim 1 further comprising a D-ring positioned on the belt webbing between the shoulder retractor and the tongue for positioning and guiding the webbing between the shoulder retractor and the tongue.

4. A seat belt system in accordance with claim 1 further comprising the shoulder refractor having a controllable clutch for selectively allowing extension and retraction of the webbing in the unlocked mode and restricting extraction of the webbing in the locked mode, the locked and unlocked modes being controlled by a shoulder retractor control signal from the controller.

5. A seat belt system in accordance with claim 1 further comprising the lap retractor having a controllable clutch for selectively allowing extension and retraction of the webbing in the unlocked mode and restricting extraction of the webbing in the locked mode, the locked and unlocked modes being controlled by a lap retractor control signal from the controller.

6. A seat belt system in accordance with claim 1 further comprising an occupant presence control signal coupled with the controller which is related to the presence or absence of the occupant in the seat.

7. A seat belt system in accordance with claim 1 further comprising the buckle producing a latching signal coupled with the controller which is related to the state of the buckle being latched with the tongue or unlatched from the tongue.

8. A seat belt system in accordance with claim 1 further comprising the thick belt section being dimensioned to prevent it from passing through the tongue.

9. A seat belt system in accordance with claim 1 further comprising the lap and shoulder retractors each having a controllable clutch for selectively allowing extension and retraction of the webbing in the unlocked mode and restricting extraction of the webbing in the locked mode, the locked and unlocked modes being controlled by a lap retractor control signal and a shoulder retractor control signal from the controller, and the buckle producing a latching signal coupled with the controller which is related to the state of the buckle being engaged with the tongue or disengaged from the tongue.

10. An inflatable seat belt system for a motor vehicle for restraining an occupant in a seat comprising:
    seat belt webbing,
    a shoulder retractor engaging an end of the webbing adjacent a shoulder belt section of the webbing for engaging the upper torso of the occupant, the shoulder retractor having a controllable clutch for selectively allowing extension and retraction of the webbing in an unlocked mode and restricting extraction of the webbing in a locked mode,
    a lap retractor engaging an end of the webbing adjacent a lap belt section of the webbing for engaging the lower torso of the occupant, the lap retractor having a controllable clutch for selectively allowing extension and retraction of the webbing in an unlocked mode and restricting extraction of the webbing in a locked mode,
    a tongue engaging the seat belt webbing and slidable along the seat belt webbing,
    a buckle engageable with the tongue to secure the seat belt webbing across the occupant, the buckle producing a latching signal coupled with the controller which is related to the state of the buckle being latched with the tongue or unlatched from the tongue,
    an inflatable belt section affixed to the shoulder belt section of the webbing, and
    a controller for selectively controlling the shoulder retractor and the lap retractor by providing control signals for the clutches of the shoulder refractor and the lap retractor based upon the presence of the occupant in the seat and the buckle latching signal to position the inflatable belt section at the upper torso of the occupant when the occupant is fastening the tongue to the buckle by selectively engaging the locked mode of the shoulder retractor and the unlocked mode of the lap retractor while the latching signal is related to the tongue being unlatched from the buckle, and engaging the unlocked mode of the shoulder retractor when the latching signal is related to the tongue being latched with the buckle upon fastening the tongue to the buckle.

11. An inflatable seat belt system in accordance with claim 10 further comprising a D-ring positioned on the belt between the shoulder retractor and the tongue for positioning and guiding the webbing between the shoulder retractor and the tongue.

12. An inflatable seat belt system in accordance with claim 10 further comprising an occupant presence control signal coupled with the controller which is related to the presence or absence of the occupant in the seat.

13. An inflatable seat belt system in accordance with claim 10 further comprising the inflatable belt section being dimensioned to prevent it from passing through the tongue.

14. A method of controlling an inflatable seat belt system for a motor vehicle for restraining an occupant in a seat comprising the steps of:
    providing a seat belt webbing,
    providing a shoulder refractor engaging an end of the webbing adjacent a shoulder belt section of the web bing for engaging the upper torso of the occupant; the shoulder retractor having a controllable clutch for selectively allowing extension and retraction of the webbing in an unlocked mode and restricting extraction of the webbing in a looked mode, providing a lap retractor engaging an end of the webbing adjacent a lap belt section of the webbing for engaging the lower torso of the occupant, the lap retractor having a controllable clutch for selectively allowing extension and retraction of the webbing in an unlocked mode and restricting extraction of the webbing in a locked mode, providing a tongue engaging the seat belt webbing and slidable along the seat belt webbing, providing a buckle engageable with the tongue to secure the seat belt webbing across the occupant, the buckle producing a latching signal coupled with the controller which is related to the state of the buckle being latched with the tongue or unlatched from the tongue, providing an inflatable belt section affixed to the shoulder belt section of the webbing and having a length selected to encompass the upper torso of the occupant, and controlling the shoulder retractor and the lap retractor by providing control signal for the clutches of the shoulder retractor and the lap retractor based upon the presence of the occupant in the seat and the buckle latching signal to position the inflatable belt section at the upper torso region of the occupant when the occupant is fastening the tongue to the buckle by selectively engaging the locked mode of the shoulder retractor and the unlocked mode of the lap retractor while the latching signal is related to the tongue being unlatched from the buckle, and engaging the unlocked mode of the shoulder retractor when the latching signal is related to the tongue being latched with the buckle upon fastening the tongue to the buckle.

\* \* \* \* \*